United States Patent
Denney et al.

(10) Patent No.: US 7,613,167 B2
(45) Date of Patent: Nov. 3, 2009

(54) METHOD AND SYSTEM FOR UPSTREAM PRIORITY LOOKUP AT PHYSICAL INTERFACE

(75) Inventors: Lisa Denney, Suwanee, GA (US); Gale Shallow, Marietta, GA (US); Niki Pantelias, Duluth, GA (US); John Horton, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 622 days.

(21) Appl. No.: 09/963,689

(22) Filed: Sep. 27, 2001

(65) Prior Publication Data

US 2003/0058837 A1 Mar. 27, 2003

(51) Int. Cl.
*H04L 12/28* (2006.01)
*H04L 12/66* (2006.01)
*H04J 3/02* (2006.01)

(52) U.S. Cl. ............... 370/352; 370/328; 370/412; 370/462

(58) Field of Classification Search ......... 370/235–477; 725/105–111, 126; 709/229–331
See application file for complete search history.

(56) References Cited

U.S. PATENT DOCUMENTS

| | | | |
|---|---|---|---|
| 4,621,365 A | | 11/1986 | Chiu |
| 5,754,535 A | * | 5/1998 | Vandenabeele et al. ...... 370/321 |
| 5,889,765 A | | 3/1999 | Gibbs |
| 5,898,684 A | * | 4/1999 | Currivan et al. ............. 370/350 |
| 5,983,315 A | * | 11/1999 | Larky et al. ................. 711/109 |
| 6,028,860 A | * | 2/2000 | Laubach et al. ......... 370/395.64 |
| 6,075,972 A | | 6/2000 | Laubach et al. |
| 6,078,607 A | | 6/2000 | Monroe et al. |
| 6,081,533 A | * | 6/2000 | Laubach et al. ............. 370/421 |
| 6,108,307 A | * | 8/2000 | McConnell et al. ......... 370/235 |
| 6,134,286 A | | 10/2000 | Chennakeshu et al. |
| 6,137,793 A | * | 10/2000 | Gorman et al. ............. 370/360 |
| 6,198,750 B1 | * | 3/2001 | Buchholz et al. ....... 370/395.42 |
| 6,236,678 B1 | | 5/2001 | Horton, Jr. et al. |
| 6,304,578 B1 | * | 10/2001 | Fluss ........................ 370/413 |
| 6,363,107 B1 | | 3/2002 | Scott |
| 6,490,727 B1 | * | 12/2002 | Nazarathy et al. ........... 725/129 |

(Continued)

FOREIGN PATENT DOCUMENTS

EP      1 096 736 A2      5/2001

(Continued)

*Primary Examiner*—Man Phan
(74) *Attorney, Agent, or Firm*—Sterne, Kessler, Goldstein & Fox P.L.L.C.

(57) ABSTRACT

A traffic prioritization system performs a coarse classification of upstream bursts at the physical interface of a headend communications device. The headend device monitors and controls communications with a plurality of remote communications devices throughout a widely distributed network, including the Internet. The traffic prioritization system includes a burst receiver that receives and sends the upstream bursts to a classifier. At an appropriate time, the classifier receives the upstream bursts and queries a priority lookup table (LUT) to determine a priority classification. The priority classification is used to separate the bursts into two or more priority levels. The higher priority level is used to designate services having a low tolerance for delay, such as telephony. Upon classification, the upstream bursts are forwarded to one of several priority queues. Each priority queue corresponds to at least one priority level. The headend device services each priority queue such that the higher priority queues are serviced before the lower priority queues.

30 Claims, 5 Drawing Sheets

U.S. PATENT DOCUMENTS

| | | | | |
|---|---|---|---|---|
| 6,546,017 B1 * | 4/2003 | Khaunte | | 370/412 |
| 6,564,017 B2 | 5/2003 | Tani | | |
| 6,650,624 B1 * | 11/2003 | Quigley et al. | | 370/252 |
| 6,788,707 B1 * | 9/2004 | Horton et al. | | 370/474 |
| 6,834,053 B1 * | 12/2004 | Stacey et al. | | 370/395.4 |
| 6,891,841 B2 * | 5/2005 | Leatherbury et al. | | 370/401 |
| 6,898,755 B1 * | 5/2005 | Hou | | 714/784 |
| 6,909,715 B1 * | 6/2005 | Denney et al. | | 370/392 |
| 6,917,614 B1 * | 7/2005 | Laubach et al. | | 370/392 |
| 6,999,414 B2 | 2/2006 | Gummalla et al. | | |
| 7,006,480 B2 * | 2/2006 | Border et al. | | 370/338 |
| 7,006,482 B1 | 2/2006 | Choi et al. | | |
| 7,095,715 B2 * | 8/2006 | Buckman et al. | | 370/230 |
| 7,120,123 B1 * | 10/2006 | Quigley et al. | | 370/252 |
| 7,154,967 B2 | 12/2006 | Boutros et al. | | |
| 7,184,398 B2 * | 2/2007 | McKinnon et al. | | 370/230 |
| 7,194,009 B2 | 3/2007 | Eng | | |
| 7,236,491 B2 * | 6/2007 | Tsao et al. | | 370/392 |
| 7,327,727 B2 * | 2/2008 | Rich et al. | | 370/389 |
| 7,333,495 B2 | 2/2008 | Sala et al. | | |
| 2001/0053152 A1 * | 12/2001 | Sala et al. | | 370/412 |
| 2002/0061012 A1 * | 5/2002 | Thi et al. | | 370/352 |
| 2002/0131413 A1 * | 9/2002 | Tsao et al. | | 370/392 |
| 2002/0154655 A1 * | 10/2002 | Gummalla et al. | | 370/468 |
| 2002/0181622 A1 * | 12/2002 | Boutros et al. | | 375/343 |
| 2003/0021237 A1 * | 1/2003 | Min et al. | | 370/252 |
| 2003/0035442 A1 * | 2/2003 | Eng | | 370/486 |
| 2003/0061623 A1 * | 3/2003 | Denney et al. | | 725/125 |
| 2005/0190696 A1 * | 9/2005 | Denney et al. | | 370/229 |
| 2006/0239273 A1 * | 10/2006 | Buckman et al. | | 370/395.41 |
| 2007/0047553 A1 * | 3/2007 | Matusz et al. | | 370/395.42 |
| 2009/0010202 A1 * | 1/2009 | Masayuki et al. | | 370/328 |

FOREIGN PATENT DOCUMENTS

| | | |
|---|---|---|
| WO | WO 00/01168 | 1/2000 |
| WO | WO 01/17168 A2 | 3/2001 |

\* cited by examiner

METHOD AND SYSTEM FOR UPSTREAM PRIORITY LOOKUP AT PHYSICAL INTERFACE

BACKGROUND OF THE INVENTION

1. Field of the Invention

The present invention relates generally to communications networking, and more specifically, to classifying signals transported over a communications network.

2. Related Art

Architects of communications networks continuously seek to achieve an optimal balance among various network characteristics. Such characteristics include bandwidth demand and quality of service parameters, such as latency, loss, or priority. For example, data-over-cable networks are expanding the variety of services traditionally provided to subscribers. In addition to television broadcasts, cable providers are offering telephony, messaging, and Internet services. As a result, additional bandwidth is needed to support the timely delivery of these services. Moreover, traditional cable broadcasts primarily require one-way communication from a cable service provider to a subscriber's home. As interactive or personal television services and other nontraditional cable services continue to be offered, communications media used to support one-way communications must now contend with an increased demand for bi-directional communications.

In a conventional cable television communications network, a communications device (such as a modem) requests bandwidth from a headend device prior to transmitting data to its destination. The headend device allocates bandwidth to the communications device based on availability and the competing demands from other communications devices. Typically, bandwidth is available to transmit signals downstream to the communications device. However in the upstream, bandwidth is more limited and must be arbitrated among the competing communications devices.

Depending on the type of service being hosted by the communications device, some communication devices or their services are granted higher priority over others. For example, telephony is less tolerant of latency, jitter, and loss than a data messaging service. As such when a voice packet arrives at the headend device, the voice packet is processed before any data packets are processed. This priority processing is implemented by application software linked to the data link layer within the headend device. At the physical layer, an electrical signal carrying a voice packet is not conventionally distinguished from a signal carrying data.

Accordingly when a signal is received at the physical interface of a headend device, the signal is delivered to the data link layer for further processing. All signals are treated alike at the physical interface, without regard to priority or other quality of service parameters. As a result, signals are forwarded to the data link layer on a first-come-first-served basis. Some of these signals may contain a higher priority packet (such as voice) requiring expedited handling to ensure good application performance. Others may contain a lower priority packet from a service that is more tolerant of delays while still providing acceptable performance standards.

Upon receipt of the signal by the data link layer, application software classifies the signal into two or more levels of priority but only after protocol processing has been completed. As a result, a signal containing a lower priority signal could be forwarded to the data link layer for protocol processing before a signal from a higher priority service. The delay resulting from forwarding a lower priority signal to the application software before forwarding a higher priority signal could be harmful to performance of the associated higher priority service. For instance, this conventional method can introduce approximately fifty to a hundred milliseconds of delay. Although it may be tolerated by data services, this amount of delay can be problematic to voice scheduling.

Therefore, a packet prioritization method and system are needed to address the above problems.

SUMMARY OF THE INVENTION

The present invention solves the above problems by providing a method and system for classifying and prioritizing signals at the physical interface of a headend device. In an embodiment, the headend device controls asynchronous communications with a plurality of cable modems throughout a distributed network.

The present invention includes a traffic prioritization system that is implemented at the physical interface. The traffic prioritization system includes a burst receiver that receives upstream bursts from the cable modems. A classifier and a priority lookup table (LUT) are also included to perform a coarse classification of each upstream burst.

In an embodiment, the classifier separates the bursts into two levels of priority. However in another embodiment, the classifier separates the burst into three or more levels of priority. The levels of priority are based on service, quality of service, subscriber source, or the like.

Two or more priority queues are also included to store the bursts upon separation into their respective level of priority. At the appropriate time, the bursts are delivered from the priority queues to other components of the headend device for further processing. The priority queues are emptied in a designated order of priority, such that a higher priority queue is serviced before a lower priority queue.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Table of Contents

I. Introduction
II. System Overview

III. Overview of Media Access Controller
IV. Traffic Prioritization
V. Physical Interface Priority Classification
VI. Conclusion I. Introduction The method and system of the present invention classifies and/or prioritizes signals at the physical interface (also referred to as "PHY-interface") of a communications device. As a result, the communications device can receive and forward the signals to the system software with packet priority information already determined and available to the application software so that the application software can process higher priority signals, such as voice, before it processes lower priority signals, such as data without introducing the additional delay that conventional communication devices incur. Although a conventional communications device may include a software application that demultiplexes and processes signals based on priority service, such prioritization occurs within the higher (or later occurring) levels of processing associated with the data link layer, namely by the software application, of the communications device and upon completion of the lower level data link layer protocol processing. As a consequence, a lower priority packet can, and often is, delivered to the software application for protocol processing before a higher priority packet. Conventional prioritization schemes, thus, introduce additional delay that can be problematic for high priority services.

A unique advantage of the present invention is the ability to classify a signal before it is delivered to the data link layer software application for further processing. Various classification schemes can be implemented with the present invention to support priority levels based on service, quality of service, signal source, or the like. Although the traffic prioritization system of the present invention is described herein with reference to a headend device, the prioritization system can be integrated with any type of communications device that receives signals of varying degrees of priority.

II. System Overview

Figure 1:
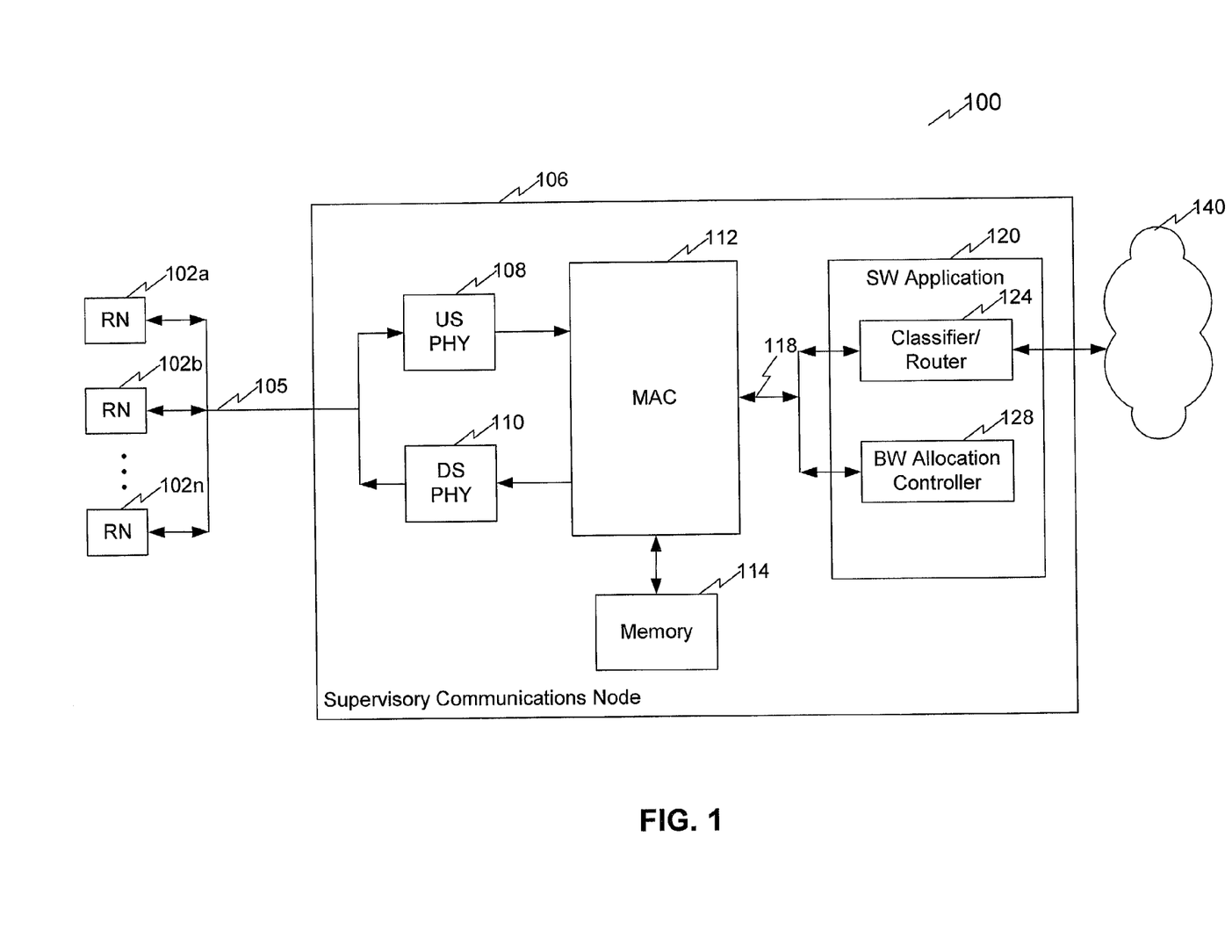
FIG. 1 illustrates a voice and data communications management system according to an embodiment of the present invention.

FIG. 1 illustrates a voice and data communications management system 100 according to an embodiment of the present invention. System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. In an embodiment, supervisory communications node 106 is a component of a headend controller for a cable communications network. As such, supervisory communication node 106 is a cable modem termination system (CMTS) or a part thereof. In an embodiment, at least one remote communications node 102 is a cable modem or a part thereof. In another embodiment, supervisory communications node 106 is a CMTS and at least one remote communications node 102 is a component of a television set-top box.

As part of a cable modem, remote communications node 102 is configurable to host one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node, a primary SID or remote node identifier (RNID) is used to identify the remote communications node or a general flow from the remote communications node 102, and a service class identifier (SCID) is used to specify a particular flow, service, or quality of service.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, coaxial, hybrid fiber-coaxial (HFC), or the like), radio, microwave, and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (including IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art. In an embodiment, supervisory communications node 106 implements time division multiplexing (TDM) to transmit continuous point-to-multipoint signals in the downstream. Again, the present invention can be configured to support other transmission modulation standards (SCDMA for one example) as would be apparent to one skilled in the relevant art(s).

The upstream represents all communications from remote communications nodes 102 towards supervisory communications node 106. In an embodiment, the upstream is divided into one or more upstream channels. Each upstream channel carries bursts of packets from remote communications nodes 102 to supervisory communications node 106. In the upstream, each frequency channel is broken into multiple assignable slots, and remote communications nodes 102 send a time division multiple access (TDMA) burst signal in an assigned slot. Again, the present invention can be configured to support other transmission modulation standards (SCDMA for one example) as would be apparent to one skilled in the relevant art.

As shown in FIG. 1, an embodiment of supervisory communications node 106 includes an upstream demodulator physical interface (US PHY) 108, a downstream modulator physical interface (DS PHY) 110, a media access controller (MAC) 112, a memory 114 and a software application 120. US PHY 108 forms the physical layer interface between supervisory communications node 106 and the upstream channel(s) of internodal infrastructure 105. Hence, all bursts from remote communications nodes 102 are received at US PHY 108. US PHY 108 processes the bursts to decompress and/or extract voice, data, requests, and/or the like from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 compresses and/or formats the information for downstream transmission.

MAC 112 receives the upstream signals from US PHY 108, or provides the downstream signals to DS PHY 110, as appropriate. MAC 112 operates as the lower sublayer of the data link layer of supervisory communications node 106. As described greater detail below, MAC 112 supports lower level data link layer protocol processing which includes but is not limited to fragmentation, concatenation, and/or error checking for signals transported over the physical layer.

Memory 114 interacts with MAC 112 to store the signals in the appropriate output priority queue as they are processed and prioritized by MAC 112. Memory 114 also stores various auxiliary data used to support the processing activities. Such auxiliary data includes security protocol data, identifiers, rules, policies and/or the like, as described in greater details below.

MAC 112 is connected to software application 120 over bus 118, which is a conventional bi-directional bus. Software application 120 operates on one or more processors to receive control messages, voice and/or data from MAC 112, and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN) or wide area networks (WAN), such as an organization's intranet, local internets, the global-based Internet (including the World Wide Web (WWW)), private enterprise networks, or the like. As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

III. Overview of Media Access Controller

The present invention permits a coarse lookup, classification and/or prioritization of signals at the PHY-interface of a communications device, such as MAC 112 shown in FIG. 1. In an embodiment, MAC 112 is an integrated circuit within a CMTS (shown in FIG. 1 as supervisory communications node 106). Accordingly, MAC 112 performs a variety of protocol processes defined by the Data Over Cable System Interface Specification (DOCSIS) for governing cable communications. The DOCSIS protocol processing includes interfacing with US PHY 108 and DS PHY 110, encrypting and decrypting data, storing packet data in queues, and/or DMA functions to exchange data with memory 114. The DOCSIS protocol processing includes, but is not limited to, interfacing with US PHY 108 and DS PHY 110, encrypting and decrypting data, packet deconcatenation, and fragment reassembly. Additionally, the MAC 112 is responsible for determining the packet's priority and storing packet data in appropriate queues, and uses DMA functions to exchange the data with memory 114 when packet storage is required or when the application software requests burst packet data. Although the present invention is described in reference to DOCSIS protocol processing, it should be understood that the present invention is intended to be inclusive of other types of communication protocols governing multimedia distribution networks.

Figure 2:
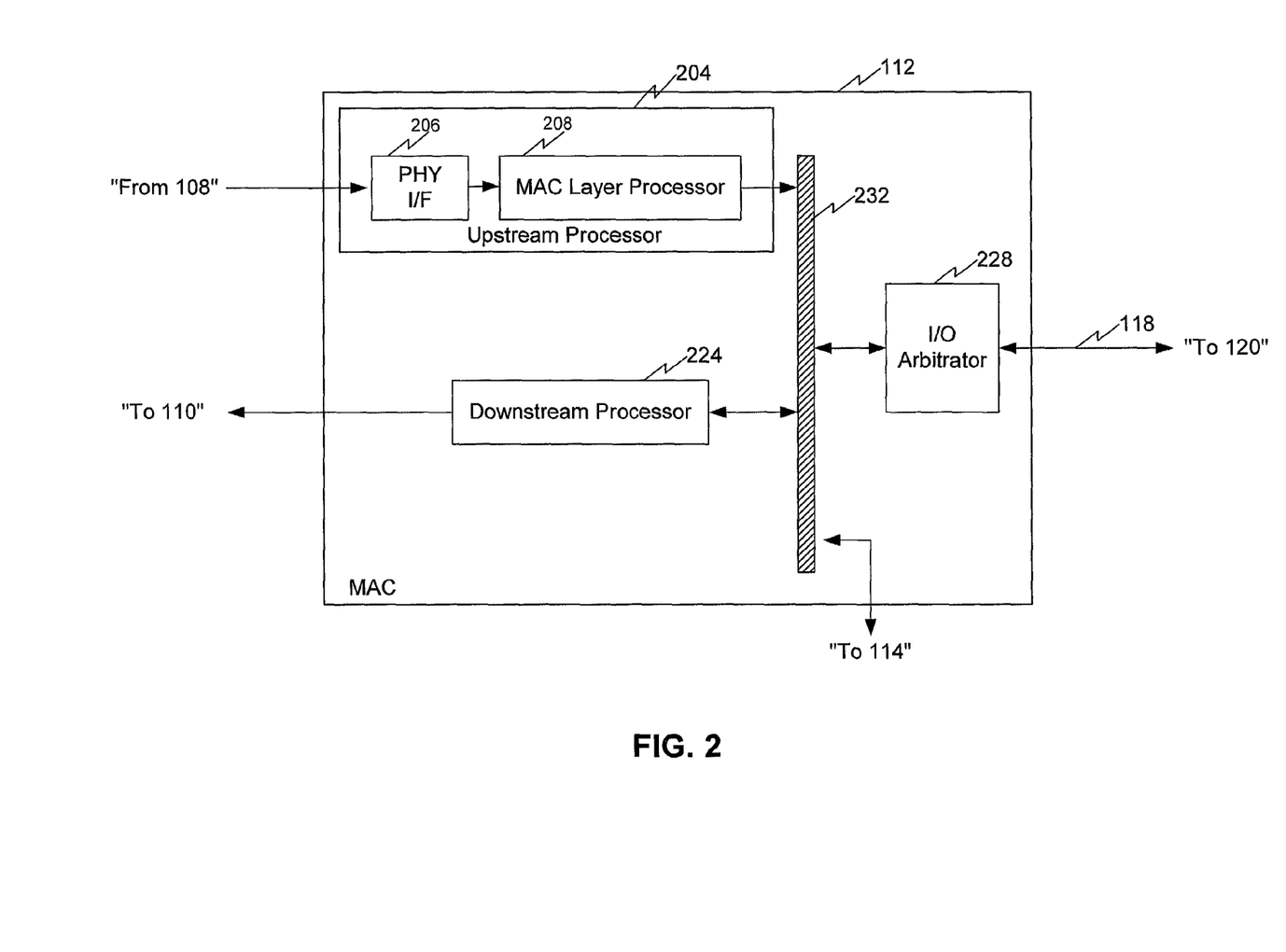
FIG. 2 illustrates a media access controller according to an embodiment of the present invention.

FIG. 2 shows the components of MAC 112 according to an embodiment of the present invention. MAC 112 includes an upstream processor 204, a downstream processor 224, and an input/output (I/O) arbitrator 228. The MAC components communicate over bus 232. In an embodiment, the components are connected to bus 232 via universal bus (Ubus) interfaces. As such, bus 232 is an internal-only split transaction bus with built-in arbitration to allow the components to communicate with each other and with a shared memory interface to memory 114.

Upstream processor 204 receives signals (including voice, data, bandwidth requests, and/or the like) from US PHY 108. Upstream processor 204 prioritizes and processes the signals according to DOCSIS protocols. Upon completion, upstream processor 204 forwards the signals to a priority queue for further processing by software application 120. The priority queues are located in memory 114.

Bus 232 supports the transfer of signals among upstream processor 204, memory 114, and I/O arbitrator 228. I/O arbitrator 228 manages the flow of signals between MAC 112 and software application 120. Particularly, I/O arbitrator 228 interfaces with bus 118 to deliver the signals to software application 120. I/O arbitrator 228 also receives signals from software application 120. Such signals include broadcast signals, control messages, and/or the like to be transported downstream. These signals are typically stored in memory 114 until MAC 112 is ready to process them.

Downstream processor 224 interacts with bus 232 to receive the downstream signals from memory 114. Downstream processor 224 formats and prepares the signals for delivery to DS PHY 110.

FIG. 2 also shows the components of upstream processor 204 according to an embodiment of the present invention. Upstream processor 204 includes a physical interface (PHY I/F) device 206, and a MAC layer processor 208.

PHY I/F 206 receives signals (i.e., voice, data and/or requests) from US PHY 108. In an embodiment, PHY I/F 206 prioritizes the signals based on source and/or service. This is implemented by utilizing the SID, RNID and/or SCID. In an embodiment, PHY I/F 206 checks the header checksum (HCS) field in the burst to perform error detection, if required. In another embodiment, PHY I/F 206 checks the cyclic redundancy check (CRC) field in the burst for error detection.

MAC layer processor 208 receives signals from PHY I/F 206 and performs header-related processing. In an embodiment, MAC layer processor 208 processes headers from the signals to extract requests. MAC layer processor 208 sends the requests to a request queue DMA (not shown).

MAC layer processor 208 receives signals from PHY I/F 206 and performs header-related processing. MAC layer processor 208 delivers the data and/or voice payloads to a burst DMA (not shown) destined for the appropriate output queue. In an embodiment, MAC layer processor 208 performs deconcatenation on the payload frames prior to sending the frames to the burst DMA. The burst DMA sends the payload frames to priority queues in memory 114.

IV. Traffic Prioritization

The present invention provides a mechanism for performing a coarse classification, lookup, and/or prioritization on each upstream burst received at MAC 112. The classification is performed at the beginning of any protocol processing to reduce latency of higher priority signals.

Figure 3:
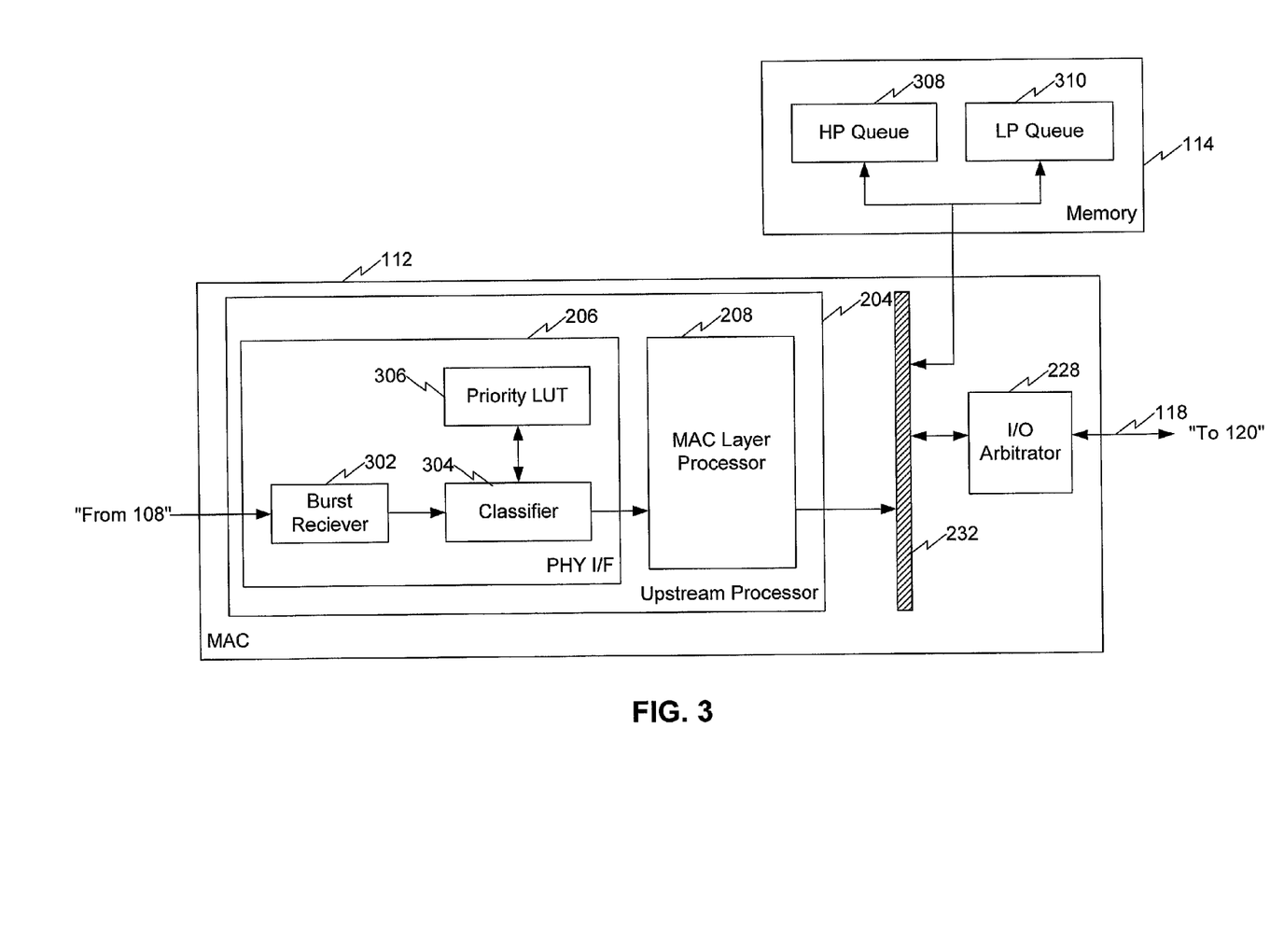
FIG. 3 illustrates a physical interface inclusive of a traffic prioritization system, and priority queues, according to an embodiment of the present invention.

FIG. 3 illustrates an embodiment of PHY I/F 206 configured to implement the traffic prioritization scheme of the present invention. Signals (i.e., electronic, electromagnetic, optical, and the like) representing upstream bursts from remote communications nodes 102 are transported via internodal infrastructure 105 to US PHY 108. US PHY 108 demodulates and delivers the signals to PHY I/F 206 which processes and classifies the signals.

PHY I/F 206 includes a burst receiver 302, a classifier 304, and a priority lookup table (LUT) 306, which collectively operate to perform priority classification at the physical interface (referred to herein as "PHY I/F 206") of MAC 112 to US PHY 108. Burst receiver 302 receives and temporarily stores burst signals from US PHY 108. Classifier 304 receives the signals from burst receiver 302 on a first-come-first-serve basis. Upon receipt of a burst signal, classifier 304 reads or extracts the SID from the signal to determine its priority. In an embodiment, classifier 304 parses the header to determine the SID.

After determining the SID, classifier 304 queries priority LUT 306 for information used to perform the priority classification. Priority LUT 306 stores a list of all assigned SIDs and corresponding priority service(s). The list is supplied and/or updated periodically or on demand by software application 120. Although priority LUT 306 is shown as an internal memory component of PHY I/F 206, priority LUT 306 can also be externally located and/or support direct memory access to memory 114 for lookup functionality.

Classifier 304 also allocates the burst signal into one of two categories. Upon completion of further processing by upstream processor 204, the burst signals are placed in an appropriate priority queue according to the classifications rendered by classifier 304. The priority queues are located in memory 114. FIG. 3 also illustrates an embodiment of memory 114 configured to implement the traffic prioritization scheme of the present invention. In FIG. 3, memory 114 includes a high priority (HP) queue 308, and a low priority (LP) queue 310. A high category, as determined by classifier 304, is used to identify higher priority services, such as voice. HP queue 308 receives all bursts allocated to the high category. Similarly, a low category is used to identify lower priority services, such as data. LP queue 310 receives all bursts allocated to the low category. I/O arbitrator 228 services the priority queues such that HP queue 308 is serviced first, or at a more frequent rate that LP queue 310.

Figure 4:
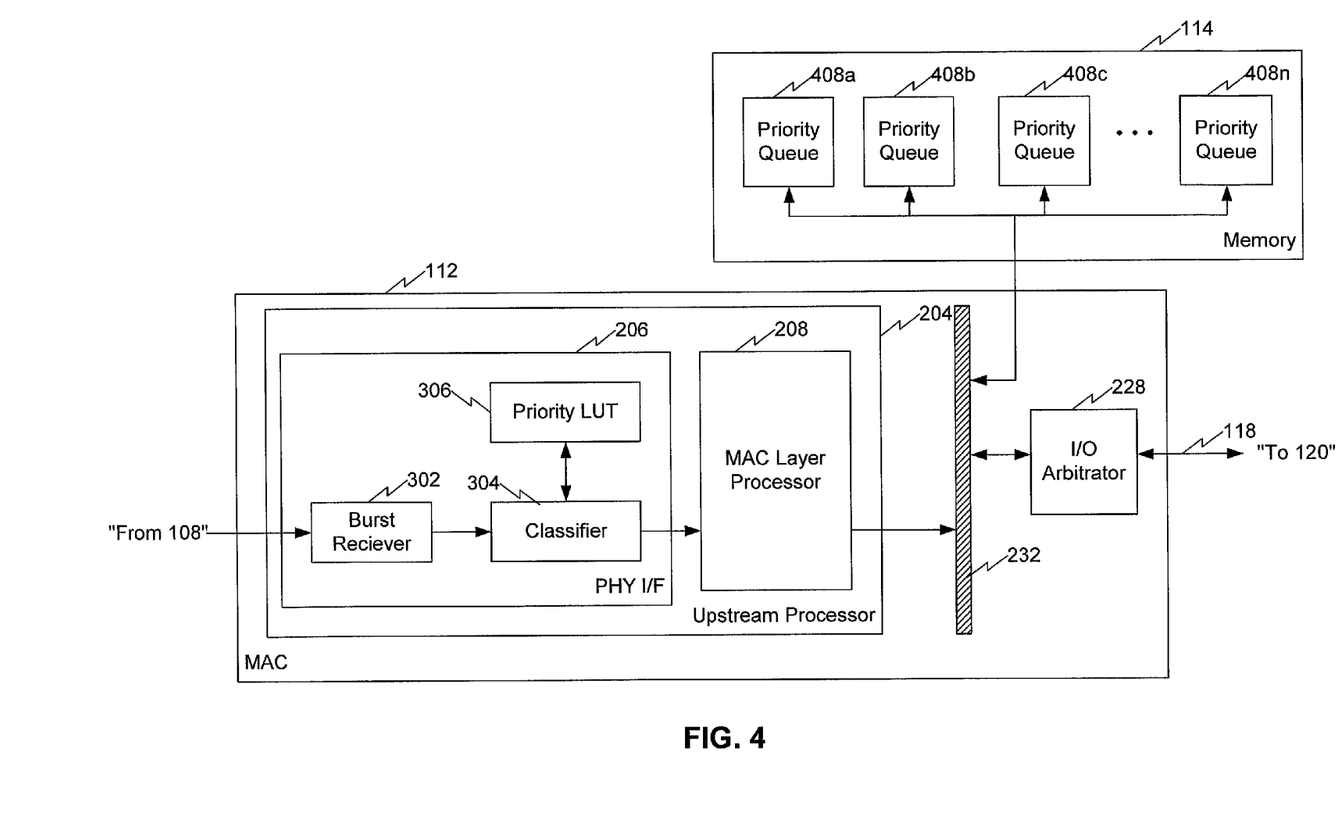
FIG. 4 illustrates a physical interface inclusive of a traffic prioritization system, and priority queues, according to another embodiment of the present inventions.

Classifier 304 illustrated in FIG. 3 classifies bursts into only two levels of priority, namely "high" and "low." However, the present invention is not limited to only two levels of priority. The present invention is adaptable to support any order of priority classification. As such, FIG. 4 illustrates a second embodiment of memory 114. In this embodiment, a plurality of priority queues 408a-408n is provided to support multiple levels (i.e., two or more levels) of priority classification. Classifier 304 queries priority LUT 306 to allocate the bursts into multiple categories based on rules and policies of software application 120 and/or some other components of supervisory communications node 106. Priority is based on service, quality of service, source, or a combination of thereof. For example, priority queues 408a-408n can be established to service voice from a first remote communications node 102 prior to servicing voice from a second remote communications node 102. In another example, priority queues 408a-408n can be established to service Internet-based video conferencing from a first remote communications node 102 prior to servicing a webcast from a second remote communications node 102, or the like.

Upon classification, further processing, and transfer to the appropriate priority queue 408a-408n, the bursts are serviced by I/O arbitrator 228 such that a higher priority queue 408a-408n is serviced before a lower priority queue 408a-408n. Alternatively, a higher priority queue 408a-408n is serviced on a more frequent basis than a lower priority queue 408a-408n. Although the priority queues (i.e., HP queue 308, LP queue 310, priority queues 408a-408n) are shown as internal components of memory 114, the priority queues can also be located in a register of upstream processor 204 or internal to MAC 112, or as an external memory.

It should be understood that although the traffic prioritization mechanism of PHY I/F 206 has been described with reference to a supervisory communications node 106, the traffic prioritization mechanism of the present invention also is configured for integration with a remote communications node 102. As such, the traffic prioritization components receive signals from other devices (including supervisory communications node 106) and performs a coarse classification at the physical interface of the remote communications node 102. The traffic prioritization components, therefore, are operable to forward higher priority signals to the data link layer of a remote communications node 102 for further processing. Moreover, the traffic prioritization system of the present invention can also be implemented in US PHY 108 to provide a coarse classification of signals delivered to PHY I/F 206.

V. Physical Interface Priority Classification

Figure 5:
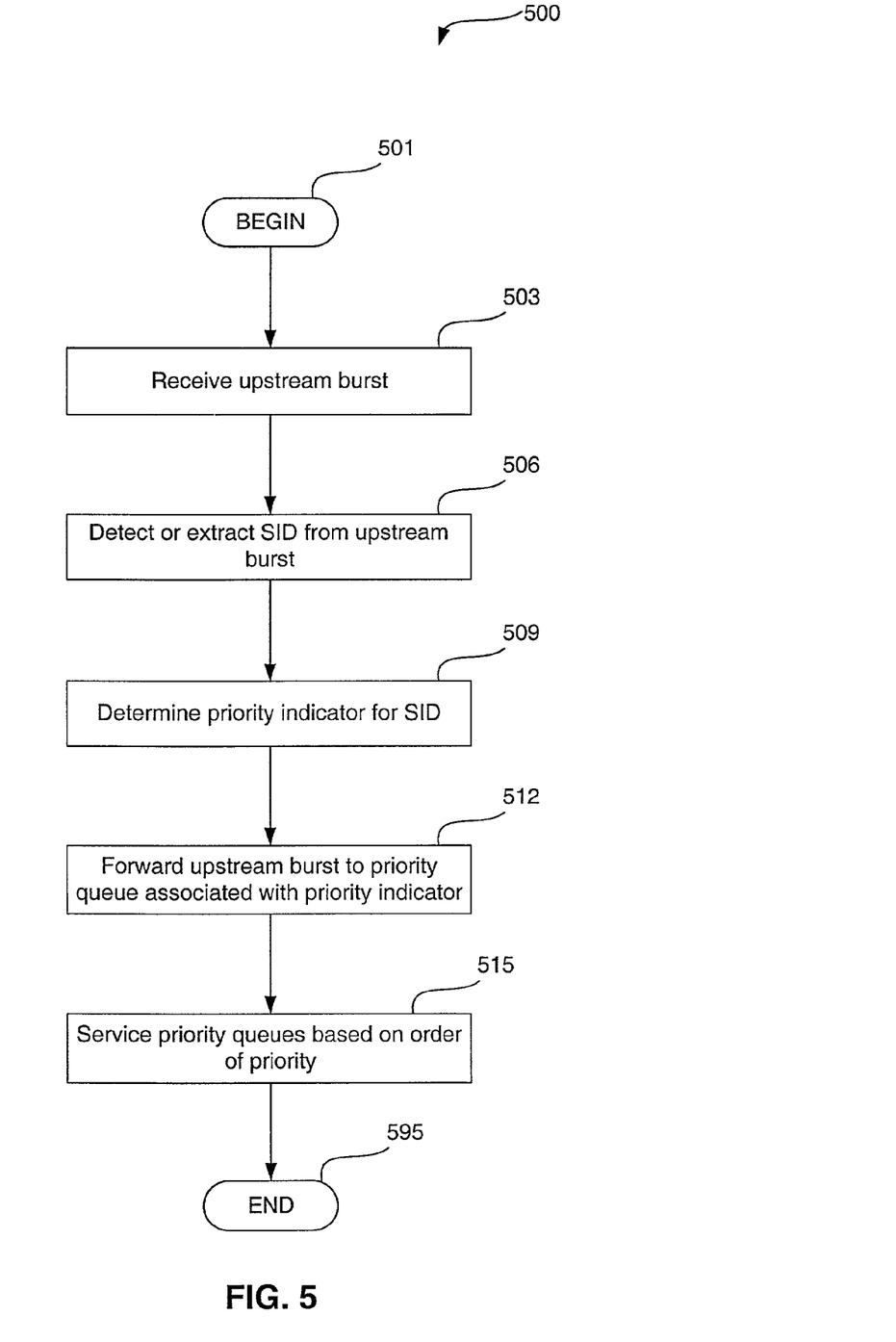
FIG. 5 illustrates an operational flow diagram for priority classification at the physical interface according to an embodiment of the present invention.

Referring to FIG. 5, flowchart 500 represents the general operational flow of an embodiment of the present invention. More specifically, flowchart 500 shows an example of a control flow for determining a priority classification of upstream bursts received at PHY I/F 206.

The control flow of flowchart 500 begins at step 501 and passes immediately to step 503. At step 503, burst receiver 302 receives an upstream burst from US PHY 108. Burst receiver 302 passes the burst immediately to classifier 304. However, in an embodiment, burst receiver 302 sends the burst in a local register or a queue in memory 114 until classifier 304 becomes available to process the signal.

At step 506, classifier 304 determines an identifier or SID for the burst. In an embodiment, classifier 304 parses the header information accompanying the burst to extract or detect the SID. If multiple SIDs have been assigned to a particular remote communications node 102 or used to distinguish service priorities, classifier 304 would extract the RNID to identify the remote communications node 102 and/or the SCID to identify the service or quality of service.

At step 509, classifier 304 queries priority LUT 306 to match the SID (RNID or SCID, if appropriate). If a match is found, priority LUT 306 returns a priority indicator for the SID to classifier 304. In an embodiment, only two levels of prioritization are supported by PHY I/F 206. The levels are high and low, as described in reference to FIG. 3. As such, the priority indicator is used to determine whether the SID has been assigned the higher priority or the lower priority. In another embodiment, multiple levels of prioritization is supported as described in reference to FIG. 4. As such, the priority indicator determines which of the multiple levels has been assigned to the SID extracted by classifier 304. If no match is found for the SID, priority LUT 306 returns the lowest priority indicator.

Referring back to FIG. 5 at step 512, classifier 304 postpends the priority indicator to the burst, and forwards the burst to MAC layer processor 208 for further processing. Afterwards, MAC layer processor 208 forwards the burst to the priority queue associated with the priority indicator. Referring back to FIG. 3, for example, if the priority indicator establishes that the SID is assigned to the higher priority, the burst is forwarded to HP queue 308. Otherwise, the burst is sent to LP queue 310.

At step 515, I/O arbitrator 228 services the priority queues (i.e., HP queue 308, LP queue 310, priority queues 408*a*-408*n*) according to the designated order of priority. In an embodiment, the higher priority queue is emptied prior to servicing a lower priority queue. However in this embodiment, it is conceivable that during periods of high trafficking, a higher priority queue(s) could continuously be in need of servicing, thereby preventing the lower priority queue(s) from being serviced. As such in an embodiment, each priority queue is serviced at a periodic rate, such that the frequency of servicing a higher priority queue exceeds the frequency of servicing a lower priority queue.

After the burst has been transmitted to I/O arbitrator 228, the control flow ends as indicated by step 595.

VI. Conclusion

FIGS. 1-5 are conceptual illustrations that allow an easy explanation of the present invention. That is, the same piece of hardware or module of software can perform one or more of the blocks. It should also be understood that embodiments of the present invention could be implemented in hardware, software, or a combination thereof. In such an embodiment, the various components and steps would be implemented in hardware and/or software to perform the functions of the present invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover, it should be understood that the method and system of the present invention should not be limited to transmissions between cable modems and headends. The present invention can be implemented in any multi-nodal communications environment governed by a centralized node. The nodes can include communication gateways, switches, routers, Internet access facilities, servers, personal computers, enhanced telephones, personal digital assistants (PDA), televisions, set-top boxes or the like. Thus, the present invention should not be limited by any of the above-described exemplary embodiments, but should be defined only in accordance with the following claims and their equivalents.

What is claimed is:

1. A method for determining a priority classification of a burst at a physical interface of a communications device, comprising the steps of:
    detecting an identifier from the burst at the physical interface, wherein said detecting occurs prior to data link layer protocol processing;
    matching said identifier to a priority indicator to determine the priority classification;
    postpending said priority indicator to the burst; and
    forwarding the burst to a priority queue associated with said priority indicator.

2. The method of claim 1, wherein said matching step further comprises the step of:
    querying a memory to determine said priority indicator.

3. The method of claim 1, further comprising the step of:
    storing the burst prior to said detecting step.

4. The method of claim 1, wherein said detecting step further comprises parsing a header associated with the burst to detect said identifier.

5. The method of claim 1, wherein said identifier is associated with a service.

6. The method of claim 1, wherein said identifier is associated with a quality of service.

7. The method of claim 1, wherein said identifier is associated with a burst source.

8. The method of claim 1, wherein said identifier is associated with at least two of a service, a quality of service, and a burst source.

9. The method of claim 1, wherein said priority indicator represents one of two levels of priority.

10. The method of claim 1, wherein said priority indicator represents one of three or more levels of priority.

11. The method of claim 1, wherein the burst is an electromagnetic signal.

12. The method of claim 1, wherein the burst is an optical signal.

13. The method of claim 1, wherein the burst is an electronic signal.

14. The method of claim 1, wherein the burst includes voice over an Internet protocol signal.

15. The method of claim 1, wherein the burst includes video conferencing signals.

16. The method of claim 1, wherein the burst includes a webcast video production.

17. A method for determining a priority classification of a burst at a physical interface of a communications device, comprising the steps of:
    detecting an identifier from the burst at the physical interface;
    matching said identifier to a priority indicator, said matching being implemented at the physical interface prior to data link layer protocol processing the burst;
    postpending said priority indicator to the burst; and
    forwarding the burst to a priority queue associated with said priority indicator.

18. A method for determining a priority classification of a plurality of bursts at a physical interface of a headend controller within a cable modem network, comprising the steps of:
processing the plurality of bursts at the physical interface to detect an identifier from each burst, wherein said processing the plurality of bursts at the physical interface occurs prior to data link layer protocol processing;
matching said identifier from each burst to a priority indicator, wherein said priority indicator represents one of two or more available priority levels;
postpending said priority indicator to the burst after matching said identifier from each burst to said priority indicator; and
forwarding each burst to one of a plurality of priority queues associated with said priority indicator from said matching step.

19. The method of claim 18, further comprising the step of:
servicing said plurality of priority queues according to a designated order of priority.

20. The method of claim 18, further comprising the step of:
servicing said plurality of priority queues to empty each higher priority queue prior to servicing a lower priority queue.

21. The method of claim 18, further comprising the step of:
servicing said plurality of queues such that each higher priority queue is serviced at a higher frequency than each lower priority queue.

22. A system for determining a priority classification of a burst at a physical interface of a communications device, comprising:
a burst receiver for receiving the burst at the physical interface;
a classifier for detecting an identifier from the burst, wherein said identifier is matched to a priority indicator and said priority indicator is postpended to the burst and wherein said detecting occurs at the physical interface prior to data link layer protocol processing;
a high priority queue associated with a high priority indicator, wherein said high priority queue receives the burst if said identifier matches said high priority indicator; and
a low priority queue associated with a low priority indicator, wherein said low priority queue receives the burst if said identifier matches said low priority indicator.

23. The system of claim 22, further comprising:
a priority storage for storing information related to said identifier, wherein said priority storage is interoperable with said classifier to match said identifier to a priority indicator.

24. The system of claim 23, wherein said priority storage includes a lookup table.

25. The system of claim 23, wherein said priority storage includes records of all assigned identifiers and corresponding services or burst sources.

26. The system of claim 22, further comprising:
a plurality of priority queues, wherein each priority queue is associated with at least one priority indicator and interoperable with said classifier to receive the burst if said identifier matches a priority indicator associated with said priority queue.

27. The system of claim 26, wherein said plurality of priority queues is positioned external to the communications device.

28. The system of claim 26, wherein each of said plurality of priority queues is an internal component of the communications device.

29. The system of claim 24, wherein the lookup table is updated periodically by a software application.

30. The system of claim 24, wherein the lookup table is updated on demand by a software application.

* * * * *

UNITED STATES PATENT AND TRADEMARK OFFICE
CERTIFICATE OF CORRECTION

| | |
|---|---|
| PATENT NO. | : 7,613,167 B2 |
| APPLICATION NO. | : 09/963689 |
| DATED | : November 3, 2009 |
| INVENTOR(S) | : Denney et al. |

It is certified that error appears in the above-identified patent and that said Letters Patent is hereby corrected as shown below:

On the cover page, in the "Reference Cited" section, the following non patent literature document should be listed: --Copy of European Search Report for European Application No. 02256762.2, issued on December 4, 2003.--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,613,167 B2
APPLICATION NO. : 09/963689
DATED : November 3, 2009
INVENTOR(S) : Denney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1291 days.

Signed and Sealed this

Fourteenth Day of December, 2010

David J. Kappos
*Director of the United States Patent and Trademark Office*